(12) United States Patent
Ogawa et al.

(10) Patent No.: US 10,442,139 B2
(45) Date of Patent: Oct. 15, 2019

(54) SEAL BAR AND HEAT SEALING APPARATUS

(71) Applicant: OMRON Corporation, Kyoto (JP)

(72) Inventors: Hironori Ogawa, Kusatsu (JP); Norihiro Ueda, Okayama (JP); Yuki Tarumoto, Suita (JP); Takaaki Yamada, Kusatsu (JP); Masahiro Ozaki, Kusatsu (JP); Morihisa Ohta, Kusatsu (JP); Akira Takaishi, Moriyama (JP); Hiroyuki Togawa, Otsu (JP); Atsushi Mukai, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/726,380

(22) Filed: Oct. 5, 2017

(65) Prior Publication Data
US 2018/0178456 A1    Jun. 28, 2018

(30) Foreign Application Priority Data
Dec. 22, 2016   (JP) .................................. 2016-249126

(51) Int. Cl.
*B29C 65/24*   (2006.01)
*B29C 65/10*   (2006.01)
(Continued)

(52) U.S. Cl.
CPC ............ *B29C 65/242* (2013.01); *B29C 51/10* (2013.01); *B29C 65/103* (2013.01); *B29C 65/18* (2013.01);
(Continued)

(58) Field of Classification Search
CPC ......... B29C 51/10; B29C 65/103; B29C 65/12; B29C 65/242; B29C 66/431; B29C 66/9121; B29C 66/91231; B65B 2051/105
(Continued)

(56) References Cited

U.S. PATENT DOCUMENTS 4,630,429 A * 12/1986 Christine ................ B29C 65/18
156/515
4,743,333 A *  5/1988 Forthmann ......... B29C 66/1122
156/359

(Continued)

FOREIGN PATENT DOCUMENTS

CN    103508007    1/2014
CN    205327551    6/2016
(Continued)

OTHER PUBLICATIONS

"Search Report of Europe Counterpart Application", dated Mar. 29, 2018, p. 1-p. 7, in which the listed references were cited.
(Continued)

*Primary Examiner* — George R Koch
(74) *Attorney, Agent, or Firm* — JCIPRNET

(57) ABSTRACT

A technique for accurately detecting a temperature of a sealing surface which is not affected by sealing conditions or the like is provided. A seal bar (1) is a rod-shaped seal bar having a sealing surface (11a) and includes a heater (13) and a temperature sensor (14). The heater (13) is provided in a main body of the seal bar (1) and extends in an extending direction (D1) of the main body (11). The temperature sensor (14) is provided at a position between the sealing surface (11a) and the heater (13) in the main body (11) of the seal bar (1) and is inserted into the main body (11) of the seal bar (1) from an end surface (upper end surface (112) or the
(Continued)

like) which intersects a long side of the sealing surface (11a).

17 Claims, 4 Drawing Sheets

(51) Int. Cl.
    *B29C 65/00*     (2006.01)
    *B29C 51/10*     (2006.01)
    *B29C 65/18*     (2006.01)
    *B29C 65/30*     (2006.01)
    *B29C 65/74*     (2006.01)
    *B65B 51/10*     (2006.01)

(52) U.S. Cl.
    CPC .......... *B29C 65/305* (2013.01); *B29C 65/745* (2013.01); *B29C 66/1122* (2013.01); *B29C 66/4312* (2013.01); *B29C 66/849* (2013.01); *B29C 66/91212* (2013.01); *B29C 66/91231* (2013.01); *B29C 66/431* (2013.01); *B65B 2051/105* (2013.01)

(58) Field of Classification Search
    USPC ........................................................ 156/359
    See application file for complete search history.

(56) References Cited

U.S. PATENT DOCUMENTS

| | | | |
|---|---|---|---|
| 5,176,028 A | | 1/1993 | Humphrey |
| 2003/0051441 A1* | | 3/2003 | Adair, Jr. ................ B29C 65/18 |
| | | | 53/451 |
| 2012/0080133 A1* | | 4/2012 | Piucci, Jr. ............... B29C 65/18 |
| | | | 156/64 |

FOREIGN PATENT DOCUMENTS

| | | |
|---|---|---|
| EP | 0023589 | 2/1981 |
| JP | H10147303 | 6/1998 |
| JP | 5423078 | 2/2014 |
| KR | 20030081578 | 10/2003 |

OTHER PUBLICATIONS

"Office Action of Taiwan Counterpart Application," with English translation thereof, dated Jan. 22, 2019, p. 1-p. 9.
"Office Action of Korea Counterpart Application," with English translation thereof, dated Feb. 18, 2019, p. 1-p. 10.
Office Action of China Counterpart Application, with English translation thereof, dated Jun. 19, 2019, pp. 1-15.

* cited by examiner

SEAL BAR AND HEAT SEALING APPARATUS

CROSS-REFERENCE TO RELATED APPLICATION

This application claims the priority benefit of Japanese application serial no. 2016-249126, filed on Dec. 22, 2016. The entirety of the above-mentioned patent application is hereby incorporated by reference herein and made a part of this specification.

BACKGROUND OF THE INVENTION

Field of the Invention

The invention relates to a technique for sealing a packaging material or the like.

Description of Related Art

For example, in a packaging machine, a seal bar having a sealing surface for thermocompression bonding is used for thermocompression bonding (sealing) of a packaging material when a package such as a snack bag is formed. In order to obtain a satisfactory sealing state at a thermocompression bonding portion of the packaging material, it is preferable to directly detect and control a temperature of the sealing surface with a temperature sensor. However, when the temperature sensor is provided on the sealing surface for this purpose, smoothness of the sealing surface is lowered, and thus the sealing state of the packaging material is adversely affected.

Therefore, conventional temperature controlling of the sealing surface has been performed by detecting a temperature of a surface different from the sealing surface of the seal bar, instead of directly detecting the temperature of the sealing surface (for example, Patent Document 1). Alternatively, the temperature sensor has been inserted into an inside of the seal bar from a side crossing a short side of the sealing surface to detect an internal temperature of the seal bar. Specifically, a heater has been provided inside the seal bar while extending in an extending direction of the seal bar, and the temperature sensor has been inserted into the seal bar in the same direction as the extending direction of the heater.

PRIOR ART DOCUMENT

[Patent Document]
[Patent Document 1] Japanese Patent No. 5423078

SUMMARY OF THE INVENTION

However, when the temperature is detected at a position different from that on the sealing surface, a difference between a detected temperature and an actual temperature of the sealing surface varies depending on sealing conditions (a structure of the seal bar, a rate of repetition of sealing (thermocompression bonding), ambient temperature, and so on). Therefore, by simply setting an offset value and then correcting the temperature detected by the temperature sensor, it is impossible to properly control the temperature of the sealing surface.

Therefore, it is an object of the present invention to provide a technique for accurately detecting a temperature of a sealing surface which is not affected by sealing conditions or the like.

A seal bar according to the present invention is a seal bar which is a rod-shaped seal bar having a sealing surface and which includes a heater and a temperature sensor. The heater is provided in a main body of the seal bar and extends in an extending direction of the main body. The temperature sensor is provided at a position between the sealing surface and the heater in the main body of the seal bar and is inserted into the main body from an end surface which intersects a long side of the sealing surface.

According to the seal bar, when heat is transferred from the heater to the sealing surface, the heat passes around the temperature sensor. Therefore, the temperature detected by the temperature sensor can easily correspond to an actual temperature of the sealing surface without being affected by sealing conditions or the like.

In the seal bar, the temperature sensor may be disposed at a position at which a distance from the end surface in a direction perpendicular to the extending direction of the main body of the seal bar and along the sealing surface is equal to or greater than an insertion depth determined by a diameter size of the temperature sensor.

In the seal bar, the temperature sensor may be disposed at a position between a center line and an auxiliary line which are approximately parallel with the long side of the sealing surface in a plan view from the sealing surface side with respect to the main body of the seal bar. Here, the center line is an imaginary straight line which bisects the sealing surface, and the auxiliary line is an imaginary straight line which further bisects a region of the sealing surface between the long side and the center line.

In the seal bar, the temperature sensor may be disposed at a position in which a distance from the sealing surface in a direction perpendicular to the sealing surface is 5 mm or less. Further, a diameter of the temperature sensor may be less than 3 mm.

A heat sealing apparatus according to the present invention includes the seal bar and a control portion which controls the heater on the basis of a detected temperature of the temperature sensor. According to the seal bar, the temperature detected by the temperature sensor can easily respond to the actual temperature of the sealing surface without being affected by the sealing conditions or the like. Therefore, a temperature change on the sealing surface easily appears in the detected temperature of the temperature sensor, and thus it is possible to accurately detect a temperature change on the sealing surface. Accordingly, a temperature change on the sealing surface is easily reflected in control of the heater based on the detected temperature of the temperature sensor, and as a result, it is possible to control the temperature of the sealing surface with high accuracy.

According to the present invention, it is possible to accurately detect the temperature of the sealing surface without it being affected by sealing conditions or the like.

DESCRIPTION OF THE EMBODIMENTS

Hereinafter, an embodiment in which the present invention is applied to a heat sealing apparatus provided in a packaging machine or the like will be specifically described with reference to the drawings.

[1] First Embodiment

Figure 1:
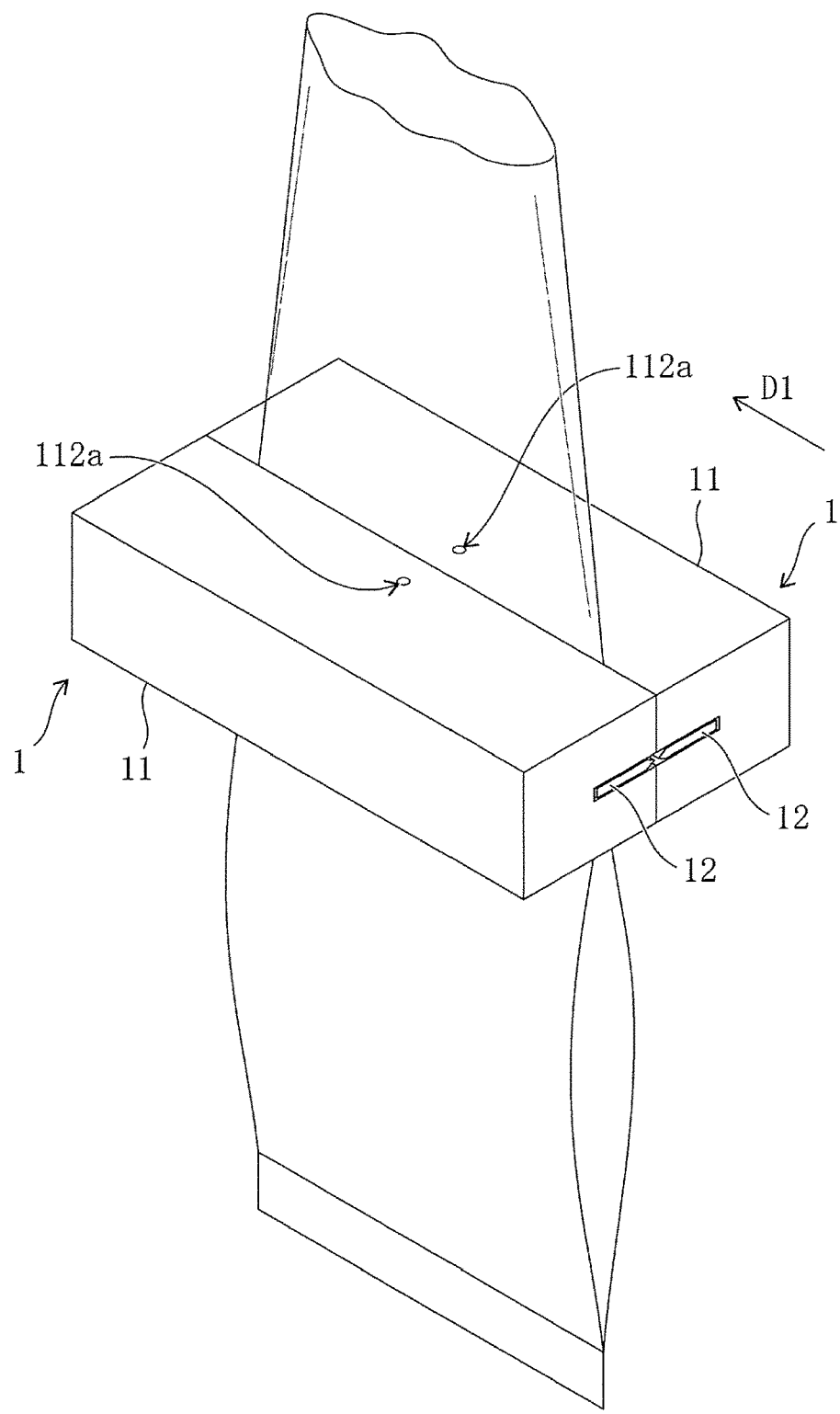
FIG. 1 is a perspective view conceptually illustrating a heat sealing apparatus according to a first embodiment.
Figure 2:
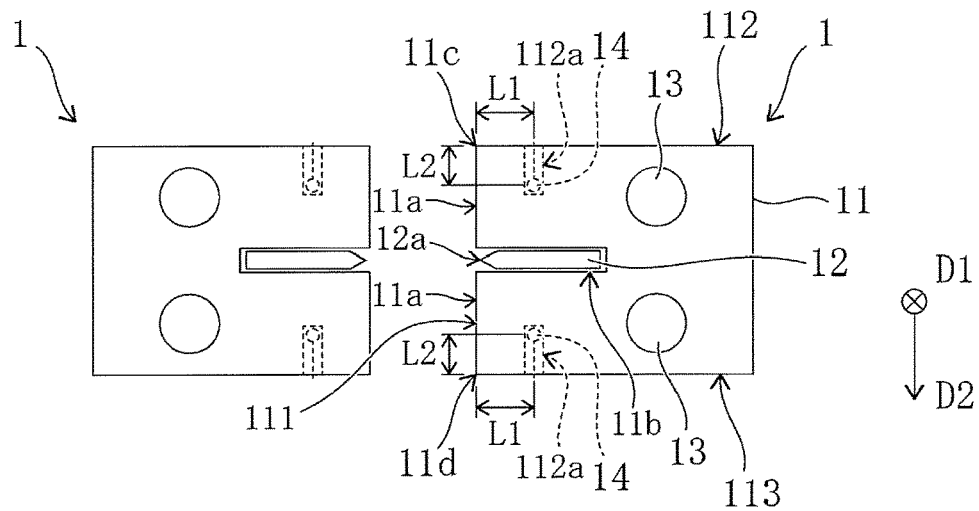
FIG. 2 is a side view conceptually illustrating the heat sealing apparatus.

FIGS. 1 and 2 are respectively a perspective view and a side view conceptually illustrating a heat sealing apparatus according to a first embodiment. As illustrated in FIGS. 1 and 2, the heat sealing apparatus has a pair of seal bars 1 which are disposed to face each other, and a sealing surface 11a is formed on each facing surface 111. Additionally, the pair of seal bars 1 press a packaging material passing through between the pair of seal bars 1 in a heated state to thermally compress the packaging material and thus form a package such as a snack bag or the like. Further, in FIG. 2, the pair of seal bars 1 are symmetrical, and only the seal bar 1 on a right side is designated by a reference numeral.

Specifically, each of the seal bars 1 includes a rod-shaped main body 11 having a sealing surface 11a, a cutting blade 12 used for cutting the packaging material at a thermocompression bonding portion, a heater 13 and a temperature sensor 14.

The cutting blade 12 has a flat blade shape and is provided on the main body 11 in a state in which a width direction of a blade edge 12a coincides with an extending direction D1 (refer to FIG. 1) of the main body 11. More specifically, a groove 11b capable of accommodating the cutting blade 12 is formed in each facing surface 111, and the cutting blade 12 is provided to be able to reciprocate between a protruding position in which the blade edge 12a protrudes from each of the facing surfaces 111 and a retracted position in which the blade edge 12a is accommodated in the groove 11b. Further, the reciprocating movement of the cutting blade 12 is performed by a driving portion 2 (refer to FIG. 4) provided in the heat sealing apparatus.

Figure 3A:
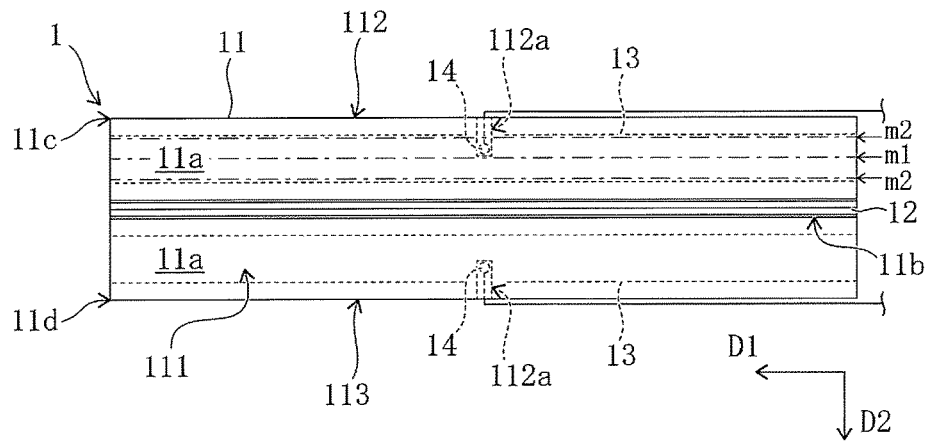
FIG. 3(A) is a plan view of a seal bar provided in the heat sealing apparatus from a sealing surface side and FIG. 3(B) is a plan view of the seal bar from an upper end surface side.

FIG. 3(A) is a plan view of the seal bar 1 from the sealing surface 11a (facing surface 111) side. As illustrated in FIG. 3(A), on each of the facing surfaces 111, one sealing surface 11a is provided on both sides (upper and lower sides in the embodiment) of the groove 11b. Further, each sealing surface 11a has a rectangular shape which extends in the extending direction D1 of the main body 11. Additionally, as illustrated in FIGS. 2 and 3A, an upper end surface 112 intersecting an upper side 11c (upper long side) of the upper sealing surface 11a and a lower end surface 113 intersecting a lower side 11d (lower long side) of the lower sealing surface 11a are further formed on the main body 11 of the seal bar 1. In the embodiment, the upper end surface 112 and the lower end surface 113 are formed approximately perpendicular to the sealing surface 11a (facing surface 111).

The heater 13 has a rod shape which is thinner than the main body 11 of the seal bar 1 and is provided inside the main body 11 in a state in which an extending direction thereof coincides with the extending direction D1 of the main body 11. Specifically, one heater 13 is provided at each of positions overlapping the two upper and lower sealing surfaces 11a in the plan view illustrated in FIG. 3(A).

Figure 3B:
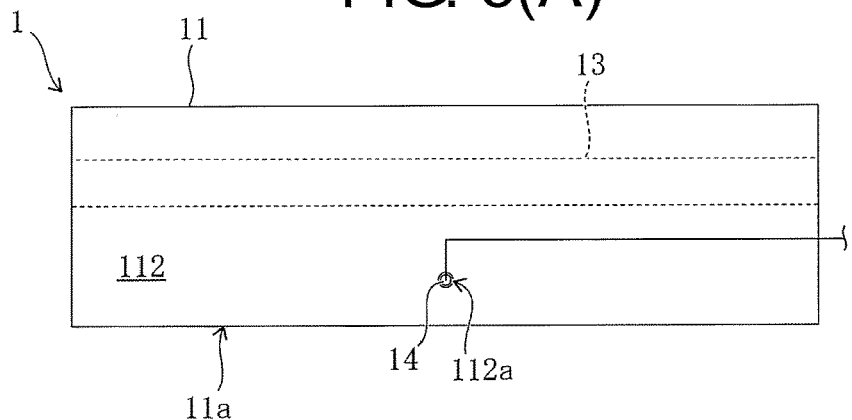

FIG. 3(B) is a plan view of the seal bar 1 from the upper end surface 112 side. As illustrated in FIG. 3(B), a perforation 112a which communicates with an inside of the main body 11 of the seal bar 1 is provided on the upper end surface 112. Specifically, the perforation 112a is formed to reach a position between the sealing surface 11a and the corresponding heater 13 (refer to FIGS. 2 and 3A). More specifically, to reach such a position, the perforation 112a extends in a direction D2 perpendicular to the extending direction D1 of the main body 11 and along the sealing surface 11a. Further, in the embodiment, the perforation 112a extends in a direction perpendicular to the upper end surface 112. In addition, in the embodiment, like the perforation 112a provided in the upper end surface 112, a perforation 112a which communicates with the inside of the main body 11 of the seal bar 1 is also provided in the lower end surface 113.

As illustrated in FIG. 3(A), for example, the temperature sensor 14 is a sensor such as a thermocouple and is inserted individually into the perforations 112a provided in the upper end surface 112 and the lower end surface 113, respectively, so that distal ends thereof reach predetermined positions inside the main body 11. That is, the temperature sensor 14 is inserted into the main body 11 from each of the upper end surface 112 and the lower end surface 113. Therefore, in the inside of the main body 11, each of the temperature sensors 14 is provided at a position between the sealing surface 11a which is a subject for detection by the temperature sensor 14 and the heater 13 corresponding to the sealing surface 11a.

According to such a heat sealing apparatus, when heat is transferred from the heater 13 to the sealing surface 11a, the heat passes around the temperature sensor 14. Therefore, the temperature detected by the temperature sensor 14 can easily respond to an actual temperature of the sealing surface 11a without being affected by sealing conditions (a structure of the seal bar, a rate of repetition of the sealing (thermocompression bonding), ambient temperature, and so on). As an example, a ratio of the heat transmitted to the temperature sensor 14 to the heat transmitted to the sealing surface 11a is likely to be approximately constant without being affected by the sealing conditions or the like. Accordingly, according to the heat sealing apparatus, it is possible to accurately detect the temperature of the sealing surface 11a without it being affected by the sealing conditions or the like.

Figure 4:
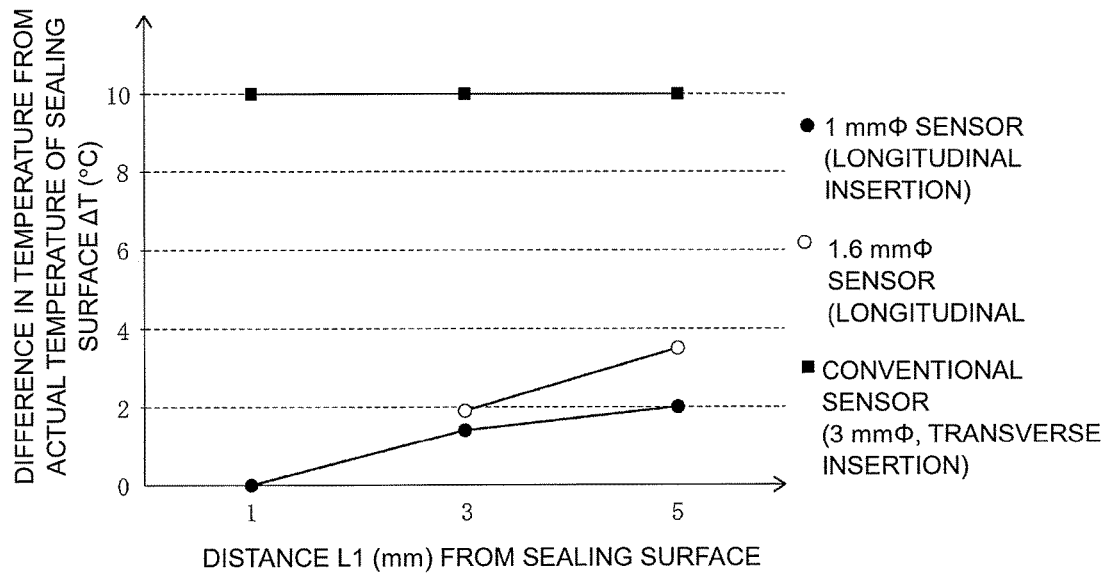
FIG. 4 is a graph made using data acquired by the inventors.

Additionally, from the viewpoint of making it possible to detect the temperature of the sealing surface 11a as described above, the inventors obtained a variety of data to be described later and optimized a position of the temperature sensor 14 and a size of the temperature sensor 14 inside the main body 11 of the seal bar 1 on the basis of the data. FIG. 4 is a graph made using the data acquired by the inventors.

The inventors prepared each of temperature sensors 14 having a diameter dm of 1 mm and a diameter dm of 1.6 mm. Additionally, by changing positions of the perforations 112a into which the temperature sensors 14 were inserted, a temperature sensor 14 having a diameter dm of 1 mm was disposed at each of positions at which a distance L1 (refer to FIG. 2) from the sealing surface 11a in a direction perpendicular to the sealing surface 11a was 1 mm, 3 mm and 5 mm, and a temperature sensor 14 having a diameter dm of 1.6 mm was disposed at each of positions in which the distance L1 was 3 mm and 5 mm. Further, for comparison with these, a conventional temperature sensor (having a diameter of 3 mm) was inserted into a seal bar from a side surface intersecting a short side of the sealing surface 11a, and a conventional temperature sensor was disposed at each of positions having the distance L1 of 1 mm, 3 mm, and 5 mm by changing the insertion position. Additionally, at the time of sealing, the temperature at each position was measured by each temperature sensor, and the actual temperature of the sealing surface 11a was measured by another temperature sensor. FIG. 4 is a graph illustrating a relationship between the distance L1 from the sealing surface 11a and a temperature difference ΔT from the actual temperature of the sealing surface 11a for each temperature sensor.

From the graph illustrated in FIG. 4, the inventors have found optimization conditions for the position and the size of the temperature sensor 14. Specifically, it was understood that, in the case of the conventional temperature sensor, the temperature difference ΔT becomes about 10° C. regardless of the distance L1 from the sealing surface 11a, but according to the temperature sensor 14 and the arrangement thereof proposed by the inventors, the temperature difference ΔT becomes 4° C. or less. Therefore, the inventors found the following conditions under the optimization condition in which the temperature difference ΔT becomes 4° C. or less.

As a first condition, it is preferable that the temperature sensor 14 be disposed at a position in which the distance L1 (refer to FIG. 2) from the sealing surface 11a in the direction perpendicular to the sealing surface 11a is 5 mm or less. More preferably, the temperature difference ΔT is 2° C. or less. In this case, regarding the temperature sensor 14 having a diameter dm of 1.6 mm, it is a condition that the temperature sensor 14 is disposed at a position in which the distance L1 is 3 mm or less. Further, regarding the temperature sensor 14 having a diameter dm of 1 mm, as in the case in which the temperature difference ΔT is 4° C. or less as the optimization condition, it is a condition that the temperature sensor 14 is disposed at a position in which the distance L1 is 5 mm or less.

As a second condition, the diameter dm of the temperature sensor 14 is preferably less than 3 mm.

Further, although not illustrated in FIG. 4, the inventors have also found the following conditions to accurately detect the temperature of the sealing surface 11a.

As a third condition, it is preferable that the temperature sensor 14 be disposed at a position in which a distance. L2 (refer to FIG. 2) from the upper end surface 112 (or the lower end surface 113) in the direction D2 perpendicular to the extending direction D1 of the main body 11 and along the sealing surface 11a is equal to or larger than an insertion depth dp (L2≥dp) determined by the size of the diameter dm of the temperature sensor 14. As an example, for the insertion depth dp, a value obtained by multiplying the diameter dm by 6 can be adopted.

As a fourth condition, it is preferable that a temperature sensor 14 be disposed at a position between a center line m1 and an auxiliary line m2 which are approximately parallel with a long side of the sealing surface 11a (the upper side 11c of the upper sealing surface 11a, or the lower side 11d of the lower sealing surface 11a in the embodiment), which is a subject of temperature detection, in a plan view (refer to FIG. 3(A)) from the sealing surface 11a (the facing surface 111) side of the main body 11 of the seal bar 1. Here, the center line m1 is an imaginary straight line which bisects each sealing surface 11a, and the auxiliary line m2 is an imaginary straight line which further bisects a region of each sealing surface 11a between each long side and the center line m1.

As a fifth condition, it is preferable that the temperature sensor 14 be disposed in a region (sealing performing region) of the sealing surface 11a which is in contact with a sealing object such as the packaging material or the like in a plan view from the sealing surface 11a (the facing surface 111) side of the main body 11 of the seal bar 1.

Figure 5:
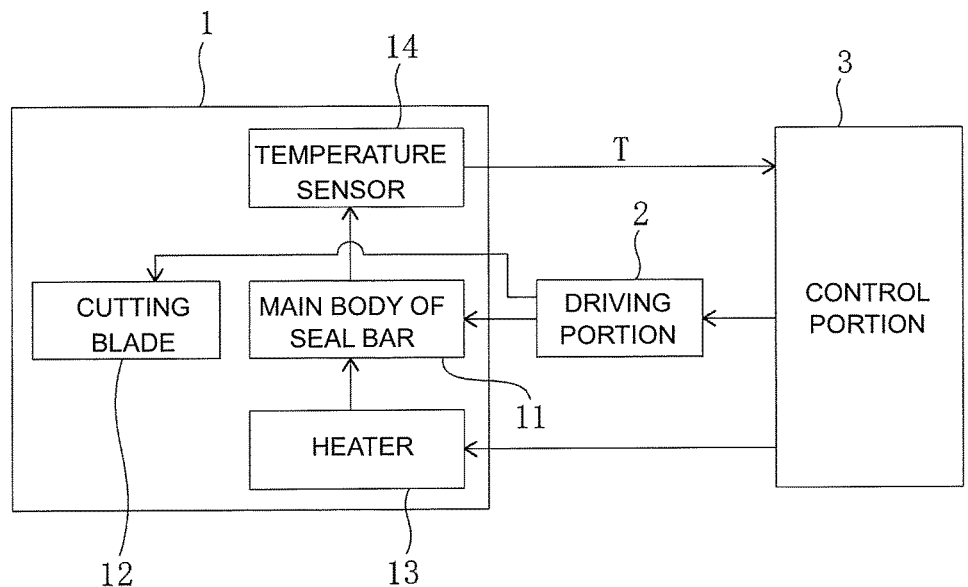
FIG. 5 is a block diagram conceptually illustrating a constitution of the heat sealing apparatus.

FIG. 5 is a block diagram conceptually illustrating the constitution of the heat sealing apparatus. As illustrated in FIG. 5, in addition to the above-described pair of seal bars 1, the heat sealing apparatus further includes a driving portion 2 and a control portion 3. The driving portion 2 is a driving mechanism which realizes operations such as an opening and closing operation when thermocompression bonding of the packaging material is performed by the seal bar 1 and a cutting operation (movement from the retracted position to the projecting position) of the cutting blade 12 when the packaging material is cut.

The control portion 3 controls at least the driving portion 2 and the heater 13. Specifically, the control portion 3 controls the driving portion 2 according to a predetermined operation program, thereby causing the driving portion 2 to repeatedly perform a sealing operation for thermocompression bonding the packaging material. Further, the control portion 3 controls the heater 13 on the basis of the detected temperature T of the temperature sensor 14 to guide the temperature of the sealing surface 11a to a desired temperature.

As described above, according to the heat sealing apparatus of the embodiment, the temperature detected by the temperature sensor 14 can easily respond to the actual temperature of the sealing surface 11a without it being affected by the sealing conditions or the like. Therefore, a temperature change on the sealing surface 11a easily appears in the detected temperature T of the temperature sensor 14, and thus it is possible to accurately detect a temperature change on the sealing surface 11a. Accordingly, a temperature change on the sealing surface 11a is easily reflected in the control of the heater 13 based on the detected temperature T of the temperature sensor 14, and as a result, it is possible to control the temperature of the sealing surface 11a with high accuracy.

[2] Second Embodiment

Figure 6:
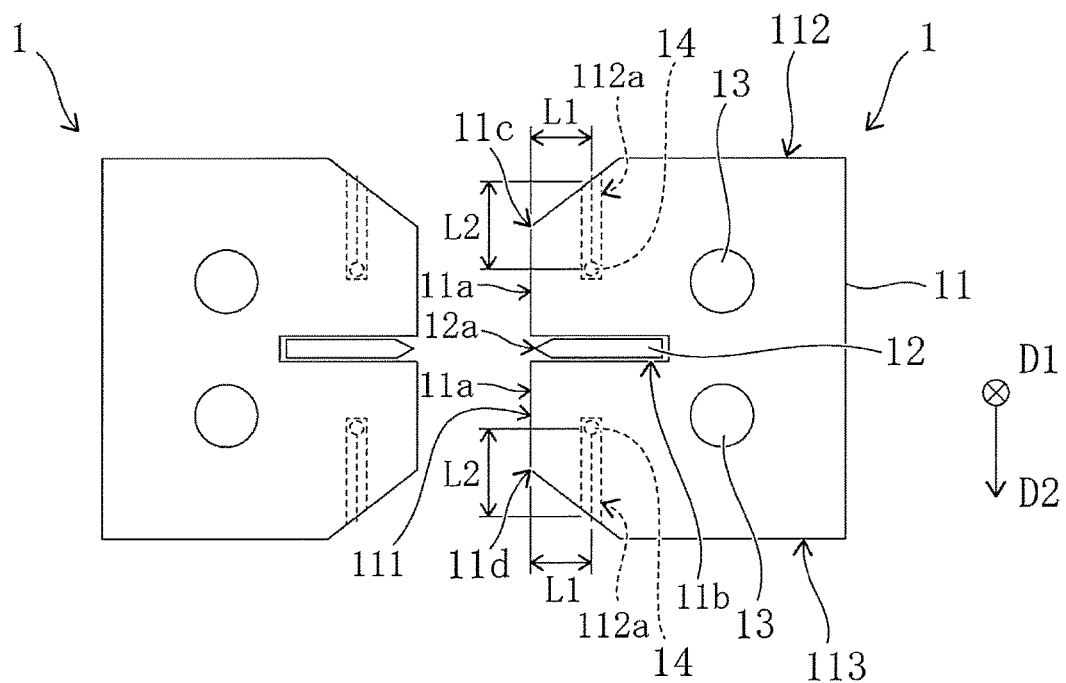
FIG. 6 is a side view conceptually illustrating a heat sealing apparatus according to a second embodiment.

FIG. 6 is a side view conceptually illustrating the heat sealing apparatus according to a second embodiment. As illustrated in FIG. 6, in each seal bar 1, the upper end surface 112 and the lower end surface 113 may be formed to be inclined with respect to the sealing surface 11a (facing surface 111). In this case, the perforation 112a may be provided on each of the inclined upper end surface 112 and lower end surface 113, and the distance L2 is a distance from an opening position of the perforation 112a in each of the upper end surface 112 and the lower end surface 113 in the direction D2.

[3] Other Embodiments

In the above-described heat sealing apparatus, the present invention is not limited to the case in which the temperature sensor 14 is provided individually to correspond to each of the upper sealing surface 11a and the lower sealing surface 11a, and only one temperature sensor 14 may be provided to correspond to only one of the sealing surfaces 11a. In addition, the number of temperature sensors 14 provided corresponding to each of the sealing surfaces 11a is not limited to one and may be plural.

The present invention is not limited to the case in which the seal bar 1 has the cutting blade 12 and can be modified into various constitutions in which at least one sealing surface 11a is formed. Further, the above-described heat sealing apparatus is not limited to the case in which one pair of seal bars 1 is provided and may have only one seal bar 1. In addition, the heat sealing apparatus is not limited to the case in which thermocompression bonding (sealing) is applied to packaging material and can also be applied to a case in which an electronic device is vacuum-sealed with an exterior member, or the like.

What is claimed is:

1. A seal bar which is rod-shaped seal bar having a sealing surface, comprising:
   a heater provided in a main body and configured to extend in a longitudinal extending direction of the main body,
   a cutting blade provided on the main body, wherein a groove is formed in the sealing surface, and the cutting blade is fully inserted in the groove in a state in which a blade edge divides the sealing surface into two portions along the longitudinal extending direction of the main body, and
   a temperature sensor provided at a position between the sealing surface and the heater in the main body,
   wherein the temperature sensor is inserted into the main body from an end surface which intersects a long side of the sealing surface, and the sealing surface has a rectangular shape which extends in the longitudinal extending direction of the main body,
   wherein a length of the heater in the longitudinal extending direction of the main body is equal to a length of the main body in the longitudinal extending direction of the main body.

2. The seal bar according to claim 1, wherein the temperature sensor is disposed at a position at which a distance from the end surface in a direction perpendicular to the longitudinal extending direction and along the sealing surface is equal to or greater than an insertion depth determined by a size of a diameter of the temperature sensor.

3. The seal bar according to claim 2, wherein the temperature sensor is disposed at a position between a center line and an auxiliary line which are approximately parallel with the long side in a plan view from the sealing surface side with respect to the main body, and the center line is an imaginary straight line which bisects the sealing surface, and the auxiliary line is an imaginary straight line which further bisects a region of the sealing surface between the long side and the center line.

4. The seal bar according to claim 3, wherein the temperature sensor is disposed at a position in which a distance from the sealing surface in a direction perpendicular to the sealing surface is 5 mm or less.

5. The seal bar according to claim 4, wherein a diameter of the temperature sensor is less than 3 mm.

6. The seal bar according to claim 3, wherein a diameter of the temperature sensor is less than 3 mm.

7. The seal bar according to claim 2, wherein the temperature sensor is disposed at a position in which a distance from the sealing surface in a direction perpendicular to the sealing surface is 5 mm or less.

8. The seal bar according to claim 7, wherein a diameter of the temperature sensor is less than 3 mm.

9. The seal bar according to claim 2, wherein a diameter of the temperature sensor is less than 3 mm.

10. The seal bar according to claim 1, wherein the temperature sensor is disposed at a position between a center line and an auxiliary line which are approximately parallel with the long side in a plan view from the sealing surface side with respect to the main body, and the center line is an imaginary straight line which bisects the sealing surface, and the auxiliary line is an imaginary straight line which further bisects a region of the sealing surface between the long side and the center line.

11. The seal bar according to claim 10, wherein the temperature sensor is disposed at a position in which a distance from the sealing surface in a direction perpendicular to the sealing surface is 5 mm or less.

12. The seal bar according to claim 10, wherein a diameter of the temperature sensor is less than 3 mm.

13. The seal bar according to claim 1, wherein the temperature sensor is disposed at a position in which a distance from the sealing surface in a direction perpendicular to the sealing surface is 5 mm or less.

14. The seal bar according to claim 13, wherein a diameter of the temperature sensor is less than 3 mm.

15. The seal bar according to claim 1, wherein a diameter of the temperature sensor is less than 3 mm.

16. The seal bar according to claim 11, wherein a diameter of the temperature sensor is less than 3 mm.

17. A heat sealing apparatus comprising:
    a seal bar according to claim 1, and
    a control portion configured to control the heater on the basis of a detected temperature of the temperature sensor.

* * * * *